US007953631B1

(12) United States Patent
Moss et al.

(10) Patent No.: US 7,953,631 B1
(45) Date of Patent: May 31, 2011

(54) PAID INCLUSION LISTING ENHANCEMENT

(75) Inventors: Kenneth A. Moss, Mercer Island, WA (US); Eric Watson, Redmond, WA (US); Eytan D. Seidman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1717 days.

(21) Appl. No.: 10/749,653

(22) Filed: Dec. 31, 2003

(51) Int. Cl.
*G06Q 30/00* (2006.01)
(52) U.S. Cl. .................. 705/14.43; 705/14.41; 715/234; 715/781
(58) Field of Classification Search .................. 705/14, 705/14.43, 14.41; 707/3; 715/234, 781
See application file for complete search history.

(56) References Cited

U.S. PATENT DOCUMENTS

| | | | | |
|---|---|---|---|---|
| 5,991,735 | A * | 11/1999 | Gerace | 705/10 |
| 6,526,440 | B1 | 2/2003 | Bharat | |
| 6,529,903 | B2 | 3/2003 | Smith et al. | |
| 6,535,888 | B1 * | 3/2003 | Vijayan et al. | 707/104.1 |
| 6,615,209 | B1 | 9/2003 | Gomes et al. | |
| 6,658,423 | B1 | 12/2003 | Pugh et al. | |
| 6,678,681 | B1 | 1/2004 | Brin | |
| 6,714,975 | B1 | 3/2004 | Aggarwal et al. | |
| 7,047,502 | B2 * | 5/2006 | Petropoulos et al. | 715/781 |
| 7,177,948 | B1 * | 2/2007 | Kraft et al. | 709/246 |
| 7,337,910 | B2 * | 3/2008 | Cartmell et al. | 209/245 |
| 7,565,409 | B2 * | 7/2009 | Heilbron et al. | 709/217 |
| 7,840,894 | B2 * | 11/2010 | Brown et al. | 715/234 |
| 2001/0047297 | A1 * | 11/2001 | Wen | 705/14 |
| 2002/0023077 | A1 * | 2/2002 | Nguyen et al. | 707/1 |
| 2002/0107847 | A1 * | 8/2002 | Johnson | 707/3 |
| 2002/0123988 | A1 | 9/2002 | Dean et al. | |
| 2002/0133481 | A1 | 9/2002 | Smith et al. | |
| 2003/0061211 | A1 * | 3/2003 | Shultz et al. | 707/3 |
| 2004/0059720 | A1 * | 3/2004 | Rodriguez | 707/3 |
| 2004/0267725 | A1 * | 12/2004 | Harik | 707/3 |
| 2007/0016491 | A1 * | 1/2007 | Wang et al. | 705/26 |

OTHER PUBLICATIONS

Juan Feng, et al., Comparison of Allocation Rules for Paid Placement Advertising in Search Engines, ICEC 2003, 2003, pp. 294-299, Pittsburgh, Pennsylvania.
Kristen Risden, et al., Interactive Advertising: Patterns of Use and Effectiveness, Proceedings of CHI '98, 1998, pp. 219-224, Los Angeles, California.
Sergey Brin, et al., The Anatomy of a Large-Scale Hypertextual Web Search Engine, Stanford University, 1998, pp. 1-18, Stanford, California.

* cited by examiner

*Primary Examiner* — John G Weiss
*Assistant Examiner* — M. Hamilton
(74) *Attorney, Agent, or Firm* — Shook, Hardy & Bacon L.L.P.

(57) ABSTRACT

The subject invention provides for systems and methods that visually enhance paid inclusion listings to facilitate offering a clear and substantial value to paid inclusion advertisers while retaining ordering rights to keep listings relevant to users. More specifically, the systems and methods allow paid inclusion listings to be visually modified at the discretion of the advertiser, the user, and/or the search service provider (e.g., publisher of search results) to facilitate differentiation among advertisers, companies, and the like. The ordering of the enhanced paid inclusion listings is not compromised based on the number or type of enhancement selected by the paid inclusion customer. A search service provider or search result publisher ("service provider") can offer a plurality, or at least one, of different types of enhancements to paid inclusion customers ("advertisers") to affect the rendering of any paid inclusion listing to the user.

7 Claims, 9 Drawing Sheets

ENHANCEMENT COMPONENT MATRIX

| | BOLD | ALT COLOR | BACKGROUND | SPECIAL ICON | THUMBNAIL |
|---|---|---|---|---|---|
| LISTING$_1$ | YES | YES | NO | NO | NO |
| LISTING$_2$ | YES | YES | NO | NO | NO |
| LISTING$_3$ | NO | NO | NO | NO | YES |
| LISTING$_4$ | NO | YES | NO | YES | NO |
| LISTING$_5$ | YES | YES | NO | YES | NO |
| LISTING$_M$ | YES | NO | NO | NO | YES |

PAID INCLUSION LISTING ENHANCEMENT

TECHNICAL FIELD

This invention is related to systems and methods that facilitate online advertisements and in particular, that relate to visually enhancing advertisements and/or search result listings.

BACKGROUND OF THE INVENTION

The advent of global communications networks such as the Internet has presented commercial opportunities for reaching vast numbers of potential customers. In particular, various types of businesses offering their services or their products for sale have flooded the Internet with their advertisements through one or more various channels. For example, most businesses or advertisers are made known to users via their respective websites in search results.

Currently, a typical search result display can include paid placement listings as well as paid inclusion listings. Paid placement listings may also be known as "sponsored sites" which are based on a bidding system. Companies who are willing to pay more per click will receive a higher ranking on a hit list. That is, position on the hit list goes to the one willing to pay the most for a mouse click. Paid placement listings are associated with a key word. Thus, when a particular key word appears in a query, then the highest-bidding company connected to that key word may be positioned at the top of the sponsored site list. The sponsored site listing provides special formatting, hence drawing the web user's attention to the listed sites. However, from the business perspective, paid placement can be and is usually very expensive and for most companies, is cost-prohibitive or not cost-effective despite the special formatting and preferential placement on the user's display.

An alternative to paid placement is paid inclusion listings. Unlike paid placement listings, paid inclusion listings are not influenced by payment. Instead paid inclusion listings are ranked by relevance according to a main search algorithm. For example, a paid inclusion customer injects many URLs along with the content associated with those webpages into a search engine. Thus, whenever search terms appear to match those terms in any particular webpage, the relevant webpage(s) can be included in the search results according to the search algorithm. In general, paid inclusion listings can be algorithmically selected to be included in a particular search result display based on their relevance with respect to the search terms and can be ranked accordingly.

Although less expensive than paid placement listings, paid inclusion listings can also be problematic and may not always be as cost-effective at least from the advertiser's perspective for many reasons. For example, poor listing performance can result despite frequency refresh rates. In addition, the user may have difficulty in viewing and/or distinguishing between paid inclusion listings especially when a large number of search results are returned.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for systems and methods that visually enhance paid inclusion listings to facilitate offering a clear and substantial value to paid inclusion advertisers while retaining ordering rights to keep listings relevant to users. More specifically, the systems and methods allow paid inclusion listings to be visually modified at the discretion of the advertiser, the user, and/or the search service provider (e.g., publisher of search results) to facilitate differentiating among advertisers, companies, and the like. Moreover, the subject invention facilitates optimizing a variety of listing display attributes while maintaining ordering rights to provide meaningful search results to the user (e.g., end user).

According to one aspect of the present invention, a search service provider or search result publisher (hereinafter, referred to as "service provider") can offer either at least one or a plurality of different types of enhancements to paid inclusion customers (hereinafter, referred to as "advertisers") to affect the rendering of any paid inclusion listing (hereinafter, referred to as "listing") to an end user. Examples of such enhancements include bolding at least a portion of the listing (e.g., in addition to bolding a search term in the listing); displaying the listing in a different or alternative color from other listings; adding a background to at least a portion of the listing; adding a "preferred listing" icon, any other relevant icon, and/or text to the listing; adding a thumbnail to the listing; replacing the listing text with a thumbnail; animating the listing; and/or changing a font and/or font size (e.g., larger) that is different from other listings.

In addition, any of the above enhancements can occur only when moused over by the user (e.g., user's pointing device hovers over the listing). Other enhancement options include dynamically modifying some portion of a listing, such as the title, based in part on the user's search terms; and/or positioning the listing in a "preferred location" of the display. Unlike paid placement listings, paid inclusion listings enhanced by the "preferred location" option are initially determined to be relevant to the search query and then can be algorithmically selected for display in the preferred location.

According to another aspect of the subject invention, the service provider can provide fixed results or customizable results to a user. More specifically, the appearance of fixed results may not be changed by a user according to the user's preferences. In this instance, an enhanced listing is presented uniformly to the respective user despite his/her display preferences. For example, if the advertiser has selected green, bolded text for its listing, then the respective user will see the advertiser's green, bolded text regardless of his/her preference for blue text.

On the other hand, users may be afforded the opportunity to customize the display of their search result listings based in part on their respective preferences and/or hardware/display device constraints. For example, some users may not like thumbnails and/or other graphical enhancements and may only want to view text. These users can provide hard-coded preferences such as "show only text" or "show no graphics". This can be particularly applicable to users who are charged based on the number of bytes downloaded from the Internet.

In addition to hard-coded or explicit preferences, user preferences can also be based in part upon user behavior and/or the user's historical data. For example, users who rarely if ever click on thumbnails can have their listings passively modified to display no thumbnails, thereby optimizing resource usage and display space. Monitoring user behavior can be performed by the service provider and report its findings to advertisers. The service provider can also analyze particular users or a subset of users and adjust their listing displays in an appropriate manner. In some cases, the service provider can override one or more enhancements, such as by "hiding" or not showing a particular enhancement, or can simply personalize them per user according to the user's preferences.

Similarly, a service provider can control the type of enhancements offered to advertisers as well as the combinations of enhancements that the advertisers can implement for any given listing or item. This can be based at least in part on feedback or comments received from a plurality of users. In addition, the service provider can refuse to display listings that conflict with a majority of users' preferences. For example, a thumbnail-enhanced listing is only available from the advertiser. If most users have indicated that no graphics are to be represented in the listing display, then the service provider can notify the advertiser that the listing will not be shown at all to such users. Likewise, the service provider can also control whether users can modify their listing displays via their individual preferences.

According to yet another aspect of the invention, advertisers can globally apply listing enhancements per service area or region based on a consensus of user behaviors in that area or region. Advertisers generally implement several variations on any one particular listing to accommodate for cultural, regional, and/or time zone differences. The service provider in each service area can report user behavior with respect to particular listings. Such reporting assists advertisers in understanding user needs as well as in maximizing their potential revenues per user. For instance, when an advertiser sees that a relatively large percentage of users are not clicking on the thumbnails, they can remove that particular enhancement to affect all users in that given service area.

Moreover, a variety of listing display attributes can be optimized to facilitate increasing revenues for the advertiser and improving user interaction with respect to such listing displays. Examples of such display attributes can include but are not limited to optimizing the user market (e.g., respecting culturing differences among different markets), display devices (e.g., recognizing device constraints such as the display screen), site or implementation of the listings (e.g., can have more than one entry point for paid inclusion listings such as an operating system or the Web—each having a slightly different display), user satisfaction (e.g., hard-coded preferences, implicit preference), listing placement (e.g., interspersed/in-line with main results or in a special section on the same display page), and/or time of delivery (e.g., time-sensitive listings provided at an appropriate time to the user).

In addition, a service provider can manage and/or control both advertiser and user preferences in order to balance the needs of the advertiser with the needs of the user, thereby creating valuable paid inclusion listings for the advertiser that satisfy the user's desire for relevant information.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 3 is a schematic diagram of an exemplary enhancement matrix component in accordance with an aspect of the present invention.

DETAILED DESCRIPTION OF THE INVENTION

Figure 1:
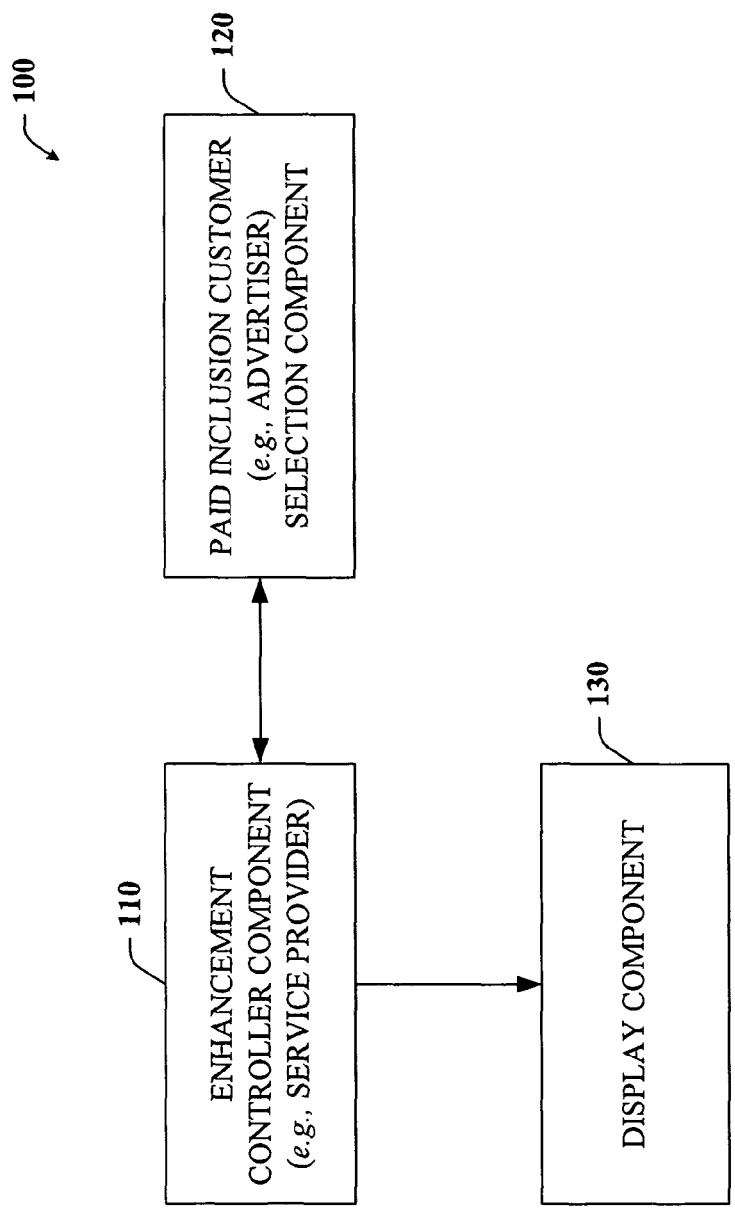
FIG. 1 is a high-level block diagram of a system that facilitates enhancing paid inclusions listings in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The subject invention can incorporate various inference schemes and/or techniques in connection with automatically determining which enhancements should be made or viewed such as per listing or per customer/end-user, respectively. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a high-level block diagram of a system 100 that facilitates providing enhanced paid inclusion listings in accordance with an aspect of the present invention. The system 100 comprises an enhancement controller component 110 that manages and controls the quantity as well as types of enhancements that can be made available to a paid inclusion customer (e.g., third-party such as an advertiser) such as per listing. Recall that paid inclusion listings, in general, are primarily based on relevance to a particular search query. Relevance, for example, can be based in part upon search terms, user profile, temporal data, and/or regional data. Typically, such listings are ordered by relevance and then presented to a user. Consequently, the user can appreciate that the order reflects a ranking of relevance, therefore providing meaningful information to the user.

By contrast, paid placement listings are based on which advertiser is willing to pay the most per click, such that the winning bidder is displayed prominently and separately from all other types of listings (e.g., paid inclusion) when there is merely a match between a search term and a term connected to the listing. That is, the bidding amount primarily influences which listings are chosen for display. In some cases, click through rate of a particular listing may also be considered (in addition to the bidding amount) when displaying the paid placement listing.

As shown in FIG. 1, a paid inclusion customer such as an advertiser can employ a paid inclusion selection component 120 to select or choose the desired enhancements either per listing or for at least a subset of listings, or both. According to the invention, the advertiser can pay to have their listing (e.g., site listing) rendered in a particular way to facilitate differentiating itself from other listings on a search results page, for example. In one instance, an advertiser can bold the text of at least a first listing. In another instance, the advertiser can add a background and a thumbnail to at least a second listing.

Other kinds of enhancements include but are not limited to displaying the listing in a different or alternative color from other listings, adding a "preferred listing" icon and/or text to the listing, animating the listing, playing a sound(s) when mousing over the listing, and/or presenting the listing in a font type, font style (e.g., italicized), and/or font size (e.g., larger) that is different from the other listings, dynamically modifying at least a portion of a listing (e.g., title or description) based in part on the user's search terms, positioning a listing in a "preferred location" apart from the other listings. It should be appreciated that any of the above enhancement options, either alone or in combination, can be visualized to a user when moused over by the user (e.g., user's pointing device hovers over the listing).

More than one version of a listing can be created to account for differences among regions, cities, states, countries and/or cultures, for example. As a result, enhancements can be selected per listing to mitigate offensive marketing campaigns. Alternatively, global enhancement selections can be made for at least a subset of listings and/or for substantially all listings in some or all markets, for example. It should be appreciated that other variations of employing global enhancement preferences are possible and are contemplated to fall within the scope of the present invention.

Still referring to FIG. 1, the enhancement controller component 110 can also provide feedback to the paid inclusion customer by way of the selection component 120 to facilitate the customer's choice of enhancements. For example, the enhancement controller component 110 can provide manual and/or automatic reporting of listing performance to the paid inclusion customer. Such information can be useful to assist the customer in ascertaining which enhancements are effective for particular types of listings per market, for example. A listing's performance can include data or information regarding the number of clicks received, location of clicks, time of day of clicks, listing content, listing enhancements, listing displayed (e.g., actual listing displayed to user to account for user-invoked preferences), search query associated with listing, and the like. Thus, reporting can provide information as to where revenues can be increased and losses decreased.

Following payment and/or implementation of the one or more selected enhancements, the enhancement controller component 110 can communicate the enhancements to a display component 130 so that enhanced listings can be properly viewed by users as they arise in search results.

Figure 2:
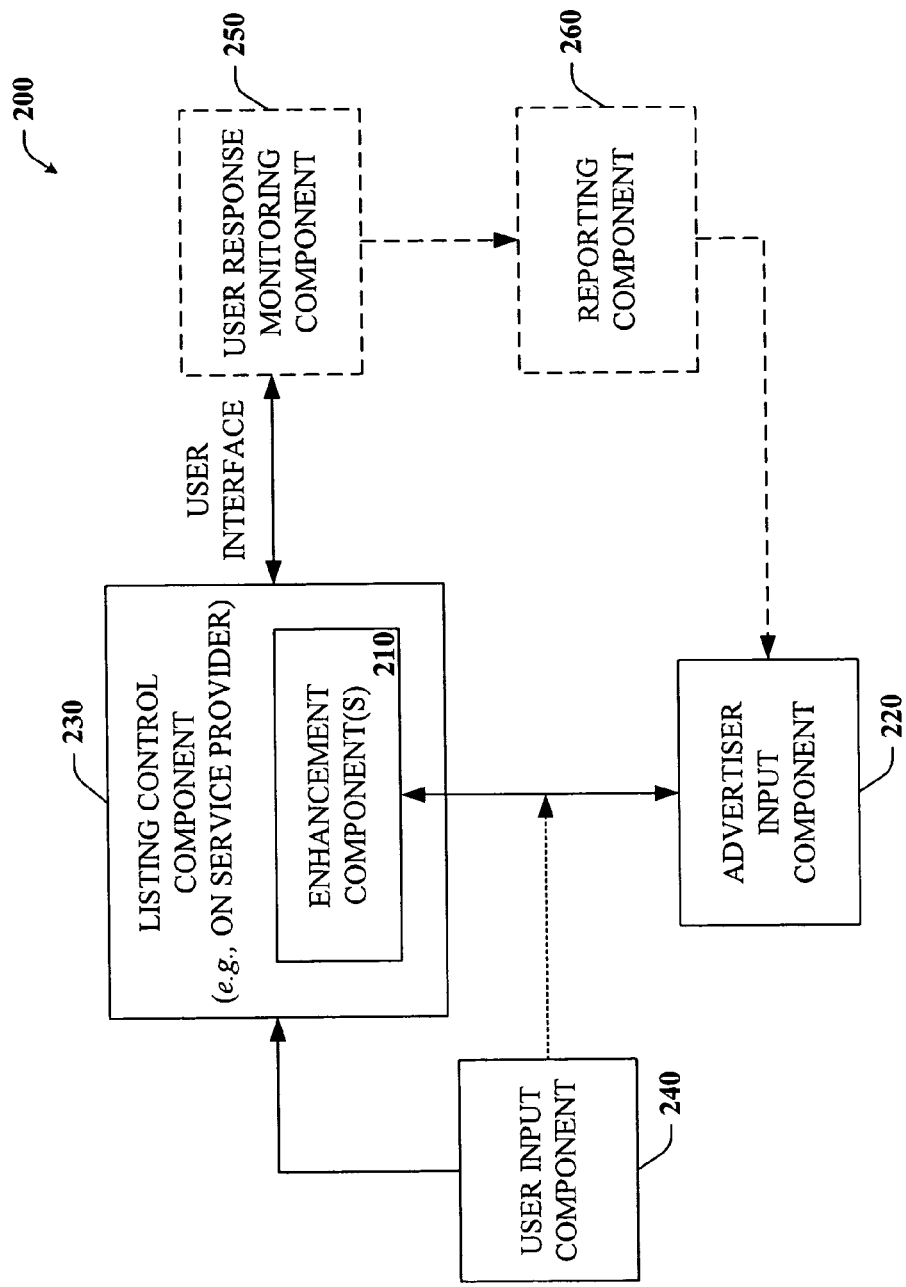
FIG. 2 is schematic block diagram of a system that illustrates multiple relationships involving a service provider, an advertiser and a user with respect to enhanced paid inclusion listings in accordance with an aspect of the present invention.

Referring now to FIG. 2, there is illustrated a general block diagram of a system 200 that essentially leverages a search result display by highlighting the display of paid inclusion listings. More specifically, the system 200 allows paid inclusion listings to be visually and/or graphically enhanced to facilitate user recognition by way of one or more enhancement components 210, for example. The one or more enhancements components 210 can be selected by the advertiser (e.g., paid inclusion customer) via an advertiser input component 220. It should be appreciated that the cost for a single or a combination of enhancements can vary according to the service provider.

The system also includes a listing control component 230 located on the service provider, for example, that can control the operation or implementation of the one or more enhancement components 210. In particular, the listing control component 230 can dictate which enhancements are available and/or which combinations of enhancements are feasible to any one advertiser.

Furthermore, the listing control component 230 can communicate with a user input component 240. In particular, the listing control component 230 can receive explicit and/or implicit data concerning user preferences with respect to listing displays. Imagine that the user can affirmatively personalize listing displays to only view graphically enhanced listings such as thumbnails. Consequently, the display can exclude text-only listings regardless of their relevance to the search query as determined by the listing control component 230.

Conversely, other users may explicitly indicate that no graphics are desired in their search results display. In this case, the listing control component 230 can "turn off" graphical enhancements on the affected listings such that any other enhancements implemented on those listings such as bolded text can still be seen by the user. For listings which are only graphically represented such as by a thumbnail, the listing control component 230 can notify the affected advertisers that their listings will not be shown to users who have turned off or opted out of viewing graphics. In other cases, whereupon a listing is merely enhanced by the addition of a thumbnail to the text, the listing control component 230 can block or hide the thumbnail from those particular users.

Alternatively, user preferences can be gauged by their behavior or response to a variety of enhanced listings. For instance, imagine that after monitoring a user's responses to a plurality of listings (e.g., via a user response monitoring component 250), it can be determined that the user clicks on thumbnail-enhanced or thumbnail listings about 80% of the time. The user response monitoring component 250 can communicate this directly to the listing control component 230 and/or to a reporting component 260 operatively connected thereto to optimize user-appeal.

The listing control component 230 can store such user data regarding user preferences as well as user behavior in a database. Thus, the listing control component 230 maintains a rich database of user information that can be quite useful to advertisers or any other paid inclusion customer wanting to optimize advertising campaigns and/or purchasing patterns. For example, an advertiser may select that its listing appear in an alternative color (e.g., other than standard color used by search engine or service provider). The listing control component 230 (or service provider) may know that the user prefers the color pink by retrieving user information from the database. Thus, all listings that are to appear in an alternative color can be shown in pink to the particular user.

Since advertiser needs may not always coincide with user preferences, the listing control component 230 can analyze input from both parties to optimize the value of paid inclusion listings for both uses and advertisers. Thus, a balance or compromise between the two sides is desirable. When balancing user preferences with advertiser preferences (e.g., selected enhancements) the listing control component 230 can assign various weights to both the user and the advertiser to facilitate its decision-making process. Various algorithms, equations, and/or artificial intelligence can be utilized as well to assist in determining and/or inferring weight assignments to optimize the needs of the user and advertiser. Hence, referring to the above scenario, listings with thumbnails may be shown to the user in some instances; and in other instances, listings without thumbnails may be shown.

User preferences and/or user behavior can be shared with advertisers by way of the reporting component 260. Personal information such as the user's identity, username and/or email address can be excluded for security reasons. The reporting component 260 can make use of the user data to generate detailed reports regarding, for example, the types of listings users are clicking on, the types of enhancements those listings have, the types of machines—and hence, display limitations—the users are operating from, the times of day the users are performing searches, and/or the location of listings (e.g., with respect to the respective display) that the users are clicking on. One or more instrumentation systems (not shown) that can be sensitive to these various parameters or attributes can be employed to facilitate the reporting component 260.

Such information can be provided to the advertisers in the form of a matrix, whereby the performance of each type or combination of enhancements can be viewed with their applicable metrics. In one aspect of the invention, reporting can be performed automatically by the service provider on a scheduled basis to provide the advertisers with current data regarding their enhanced or non-enhanced listings. Therefore, they can readily determine whether changes to their listings are needed.

In practice, some advertisers may not know which enhancements or which combination of enhancements per listing to purchase in order to obtain the most value for their investment. Thus, in another aspect of the invention, automatic reporting can be optimized for advertisers who are unsure or hesitant about selecting the enhancements. For example, the service provider (together with the listing control component 230) can generate a plurality of parallel listings, each having different enhancement options assigned thereto. For a set period of time, user responses to the parallel listings can be collected and then reported to the advertiser to assist them in choosing the more valuable enhancement treatments.

Moreover users can influence the manner in which listings are rendered and displayed; however, service providers can make the final determination as to the rendering of listings, whether enhanced or not, in order to balance the needs and preferences of both the user and the advertiser.

Referring to FIG. 3, there is illustrated an exemplary enhancement component matrix 300 in accordance with the present invention. The matrix 300 can be generated by a service provider and provided to an advertiser to facilitate the enhancement selection process. As can be seen in the matrix 300, each row corresponds to a listing 310, such as a first listing (e.g., LISTING$_1$ 320) up to an M$^{th}$ listing (e.g., LISTING$_M$ 330). Each column 340 corresponds to an enhancement option such as adding a thumbnail 350. For example, LISTING$_1$ 320 has no added background, no added special icon, and no added thumbnail but does have bolded text in an alternative color, as indicated by the respective "yes" and "no" selections for each respective enhancement option. It should be understood that the present invention is not limited to the options included in the matrix 300. Rather, additional options can be provided to the advertiser. Furthermore, not all options must be offered to the advertiser for all listings.

Figure 4:
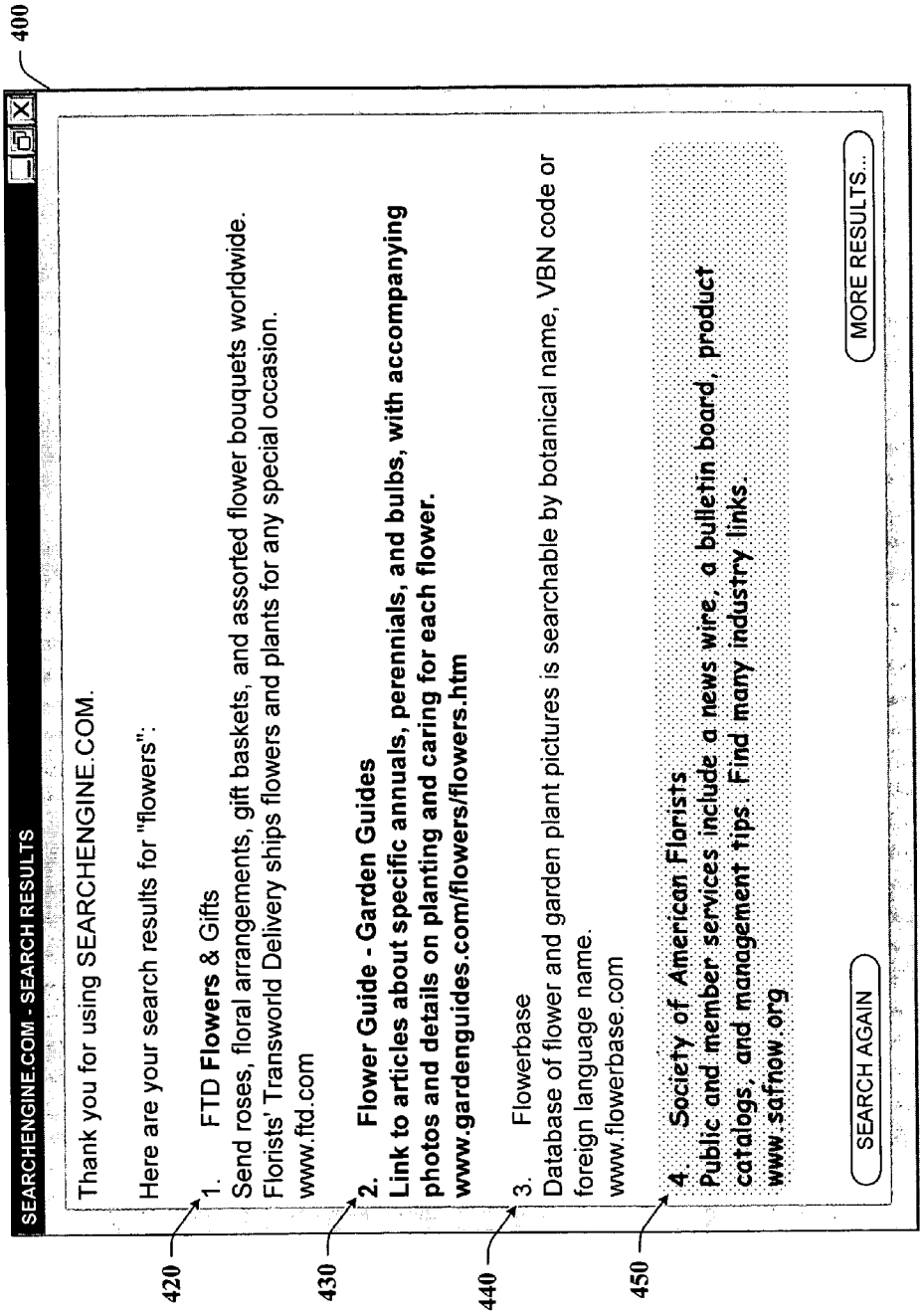
FIG. 4 is an exemplary user interface that demonstrates enhanced paid inclusion listings in accordance with an aspect of the present invention.
Figure 5:
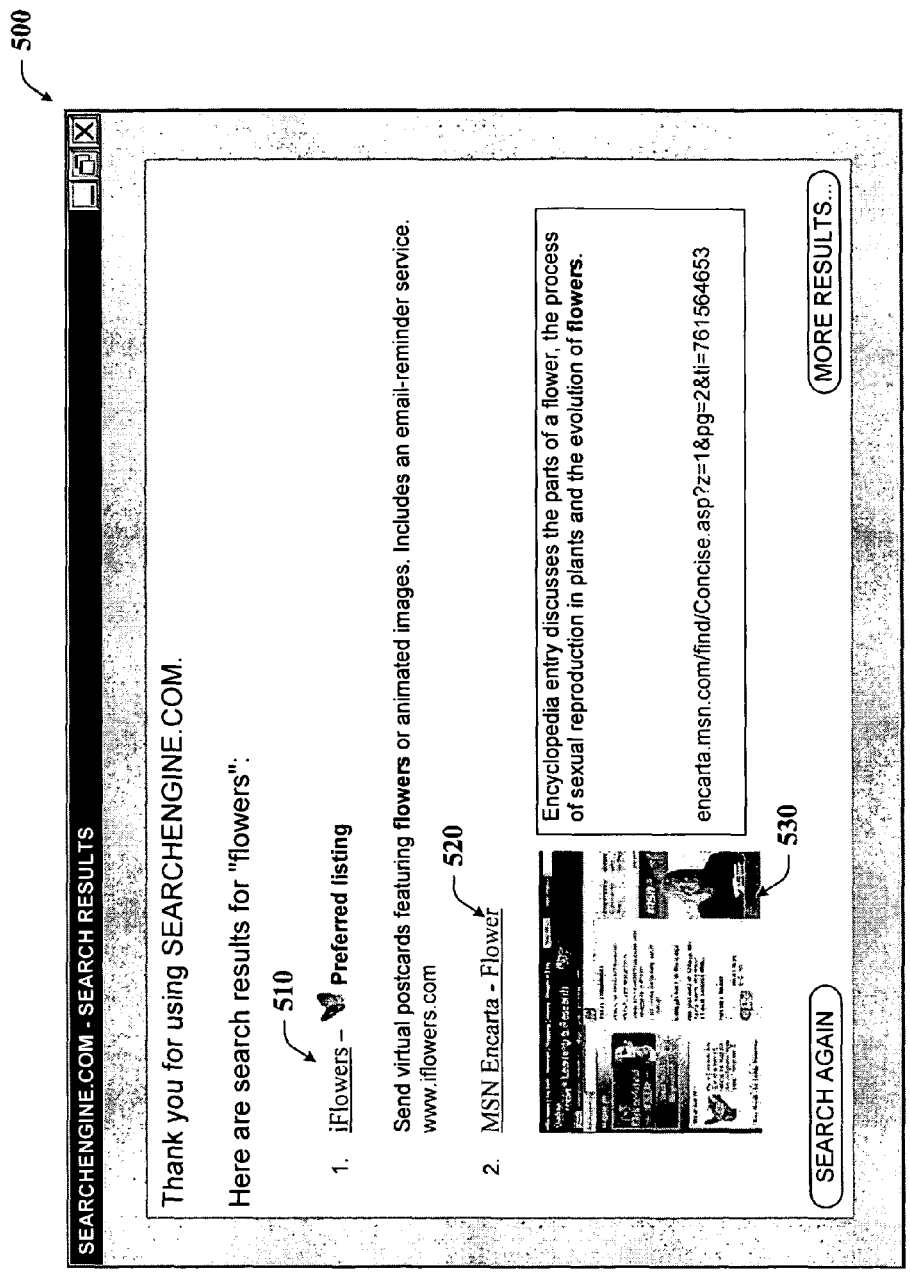
FIG. 5 is an exemplary user interface that demonstrates enhanced paid inclusion listings in accordance with an aspect of the present invention.
Figure 6:
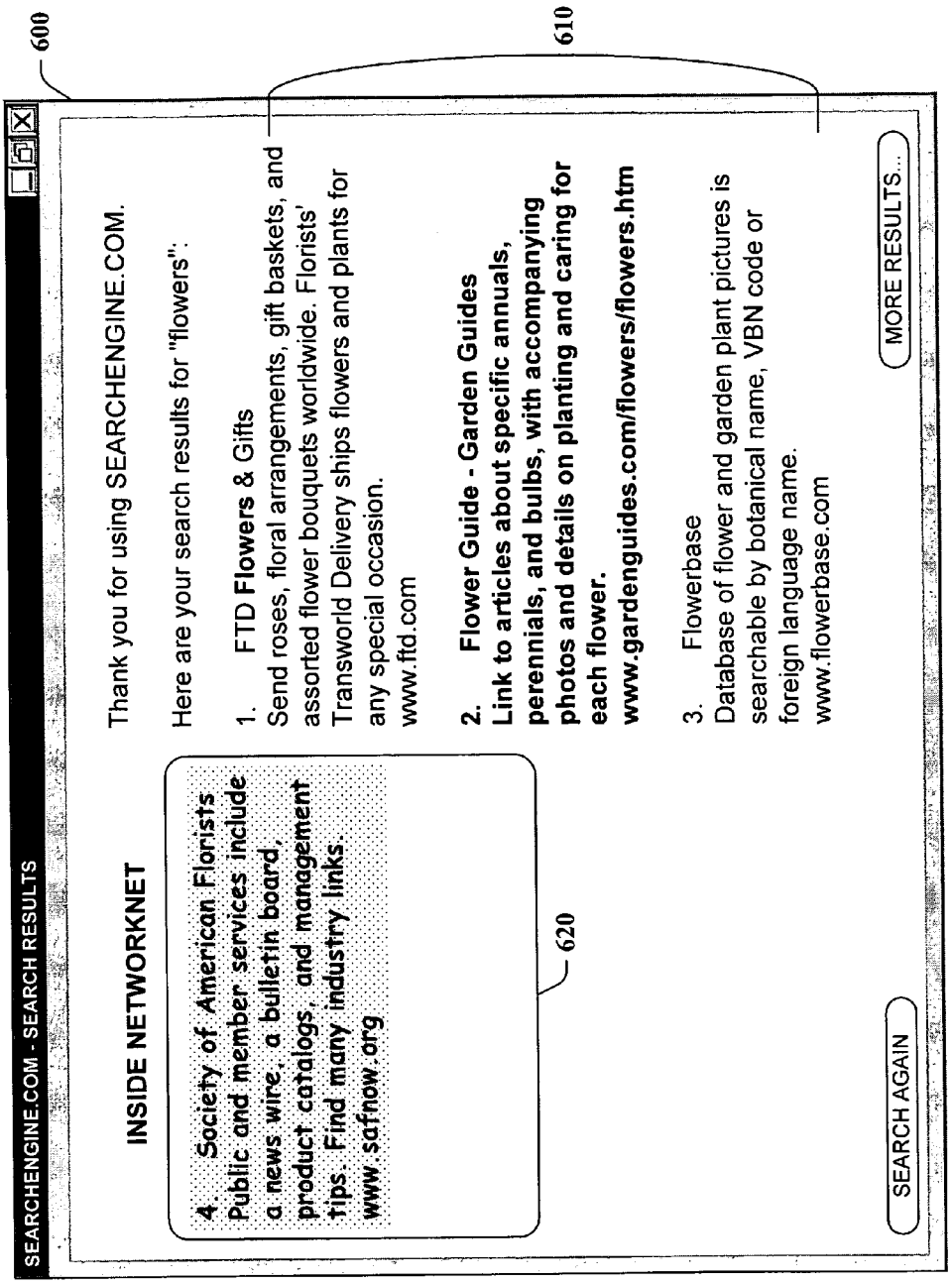
FIG. 6 is an exemplary user interface that demonstrates enhanced paid inclusion listings in accordance with an aspect of the present invention.

FIGS. 4-6, infra; demonstrate exemplary user interfaces as viewed by a user who has submitted a search request in accordance with the present invention. The various user interfaces depict the many different ways in which search results can be highlighted for display as described hereinabove.

Referring now to FIG. 4, an exemplary user interface 400 illustrates a search results page 410 that can be viewed by a user. The search results are ranked by order of relevance such as listing 420 being ranked as the most relevant (e.g., 1) with respect to the user's search query (e.g., flowers). Listings 430, 440, and 450 follow in that order (e.g., 2$^{nd}$, 3$^{rd}$, and 4$^{th}$) in terms of relevance to the search query. As can be seen, the listing 420 represents a conventional paid inclusion listing, and thus has not been enhanced. However, the listing 430 is bolded, the listing 440 appears in an alternative color (e.g., other than black), and the listing 450 appears in a different font (from the standard font). A background (e.g., dotted lines) has been added to the listing 450 as well.

The user interface 500 in FIG. 5 illustrates additional types of enhancements in accordance with the present invention. For example, a "preferred listing" label and icon have been added to listing 510. Furthermore, a thumbnail 530 (link) has been added to listing 520, whereby the user can visualize the website featured in or associated with the listing.

Finally, the user interface 600 in FIG. 6 illustrates a placement enhancement in accordance with the present invention. The user interface comprises search results 610 depicted in a similar manner such as those in FIG. 4, supra. That is, the search results 610 are ranked and ordered based in part upon their relevance with the user's search query. In addition to being relevant to the search query, section 620 can include one or more listings that have been algorithmically selected to appear in this more prominent display area 620 of the page.

Advertisers can also purchase the placement enhancement which provides them an opportunity to be viewed apart from the other search results. However, the one or more search results must primarily be relevant to the user's search request; and then subsequently, can be selected using one or more algorithms to appear in the section 620. This is in contrast with paid placement listings which are solely based on payment (e.g., highest bidder), whereby relevance to the user's search request is not considered. In the figure, the fourth listing (450, as shown in FIG. 4) now appears in the section 620.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figures 7, 8:
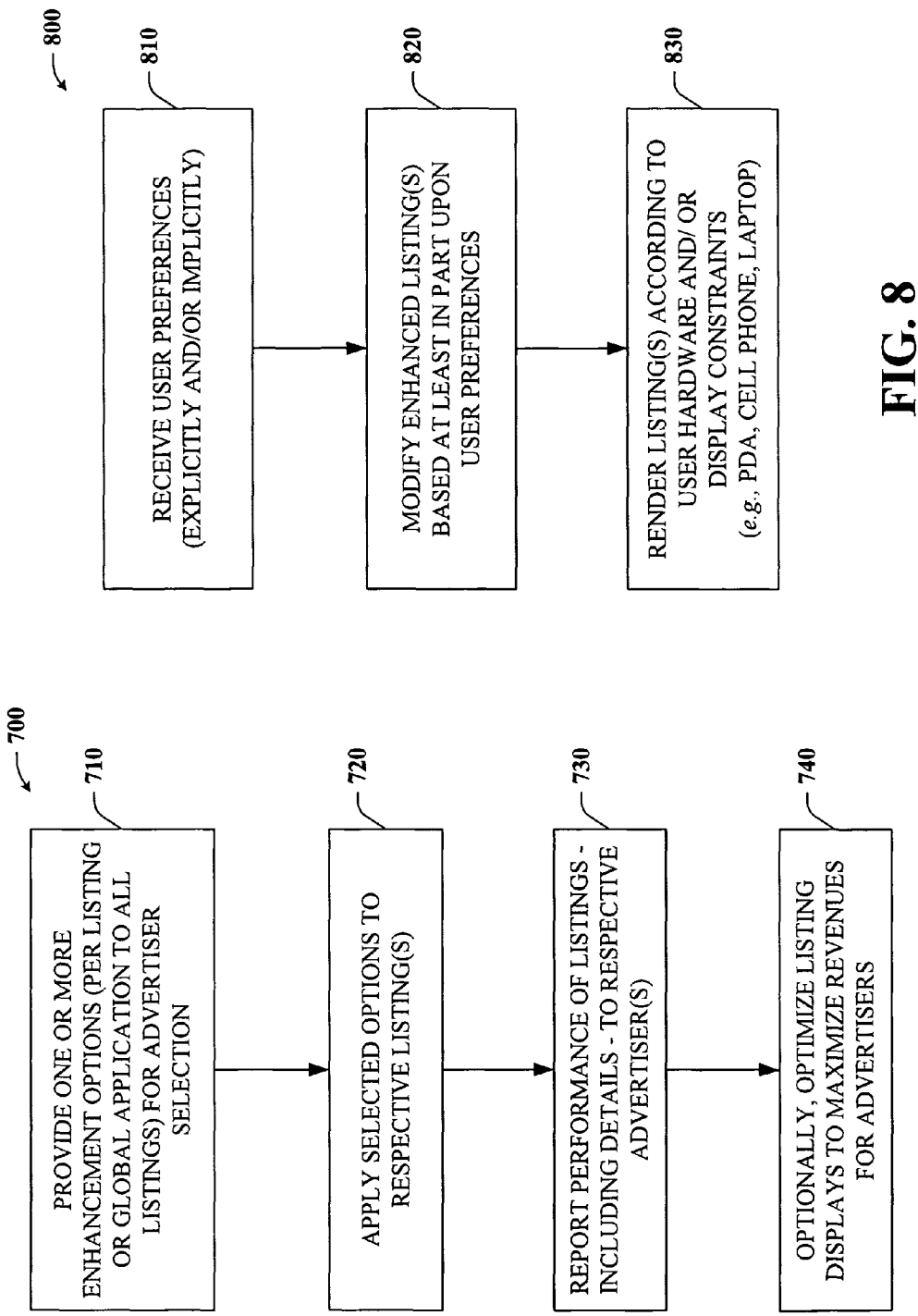
FIG. 7 is a flow diagram of an exemplary process that facilitates enhancing paid inclusion listings in accordance with an aspect of the present invention.
FIG. 8 is a flow diagram of an exemplary process that facilitates enhancing paid inclusion listings based at least in part upon user preferences in accordance with an aspect of the present invention.

Referring now to FIG. 7, there is illustrated a flow diagram of an exemplary method 700 that facilitates improving the appearance of paid inclusion listings. The method 700 can begin by providing one or more enhancement options from which an advertiser can select (at 710). Selections can be made per listing or for global application to at least a subset of listings. For instance, it may be more appropriate and/or cost-effective for a first subset of listings to be animated than it would be for all listings to be animated.

At 720, a service provider or other suitable component can apply the selected options to the respective listings according to the advertiser's specifications. Shortly thereafter, the enhanced listings can be made available for viewing in relevant search result displays. At 730, the performance of at least a subset of the enhanced listings can be reported to the respective advertiser(s). In addition to the performance ratings of the listings, other information associated with the users and/or the listings can be included in the reports. For example, information involving user location, demographics, display device, and/or time of use can be provided to the advertisers to facilitate their analysis and determination regarding more or less effective advertisement campaigns and/or enhancements.

Because advertisers are charged a fee for such enhancements, some advertisers may be hesitant to rely on their own limited knowledge regarding user interests in a particular market when choosing enhancements. Even for market savvy advertisers, listing performance reports may be contrary to market theories and/or projection models. To resolve either scenario, the advertiser can choose to optimize their listings at 740. This involves generating a plurality (e.g., at least two) of parallel listings, each having different enhancements, and then reporting the performance of each listing in an automated fashion to the advertiser.

It should be appreciated that enhancements can "expire" after a period of time (e.g., 30 days, 6 months, etc.) as desired by the service provider. Thus, advertisers can be charged per enhancement per listing depending on the term length. When a user has opted against viewing one or more enhancements, the advertiser may or may not be charged based on the agreement with the service provider. Because paid inclusion listings are generally less expensive than paid placement listings, charges for enhancements should be maintained at a reasonable rate so as not to discourage advertisers from the use of paid inclusion listings.

Turning now to FIG. 8, there is illustrated a flow diagram of an exemplary method 800 that demonstrates the ways in which a user can influence the appearance of his/her own search results display. The method 800 involves receiving input regarding a user's preferences at 810. For instance, a user can provide hard-coded preferences by selecting options relating to how he/she prefers to view search results (e.g., listings). In particular, a user can explicitly deselect (e.g., turn off) a view graphics option. Thus, no thumbnail or icon enhancements will be displayed to the user.

Alternatively or in addition, the appearance of search results can be passively modified based at least in part upon the user's behavior (e.g., historical data). For example, a monitoring component can watch and/or gather information about the user's click patterns and perhaps note that the particular user never clicks on bolded listings. Therefore, future search results can exclude bolded listings or can be shown without the bold enhancement (e.g., no listings are excluded but "bold" is removed or turned off).

Though not depicted in the method 800, advertisers can select one or more alternative enhancements to invoke should any user opt out of their preferred enhancement. For instance, an advertiser might prefer the addition of a thumbnail to the listing. However, if a user has turned off the viewing of graphics, then the listing can be enhanced with an alternative color instead of the thumbnail.

Once the listings are modified according to the user's preferences at 820, the relevant listings can be rendered on the user's display according to the user's display constraints at 830. The type of display device can be determined by the service provider to facilitate maximizing the viewable space for the user. This can be particularly useful since the Internet can be accessed from small display devices such as handheld devices including PDAs, cellular phones, and even smaller-sized laptops.

Figure 9:
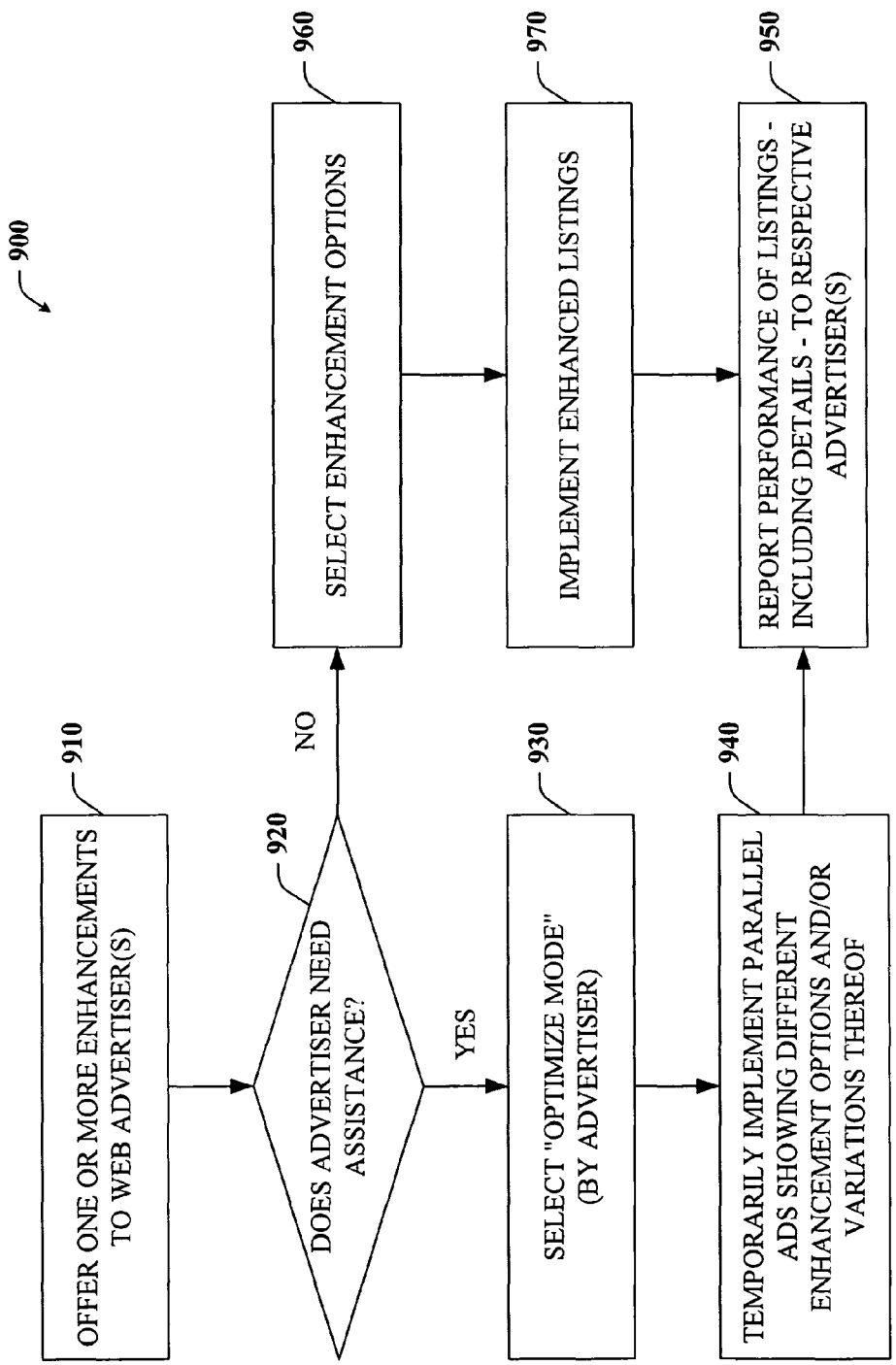
FIG. 9 is a flow diagram of an exemplary process that facilitates assisting advertisers in determining how to enhance their paid inclusion listings in accordance with an aspect of the present invention.

Referring to FIG. 9, there is illustrated a flow diagram of a method 900 that facilitates optimizing reporting techniques as well as advertiser revenues with respect to advertisement (listing) strategies and campaigns. The method 900 can begin at 910, wherein a service provider can offer one or more enhancement options to web advertisers (e.g., web retailers, businesses, etc.) who currently employ or who are interested in employing paid inclusion listings.

At 920, the advertisers can be asked whether they need assistance in making their enhancement selections. Alternatively, advertisers can be given the option to select "optimize mode", thereby inferring their request for assistance. If an advertiser does need assistance, then optimize mode can be selected at 930. At 940, a plurality of parallel ads or listings can be at least temporarily implemented to facilitate determining which enhancements or which combination of enhancements attract the most user attention (e.g., clicks) for each listing or subset of listings. Each listing or subset of listings can have different enhancements and a detailed report of each listing's performance can be automatically provided to the advertiser at 950. From this point, the advertiser can modify the listings and/or enhancements according to the performance reports.

Alternatively, if the advertiser can determine which enhancements to select without invoking the "optimize mode" at 920, then at 960, the advertiser can select the enhancement options. At 970, the enhanced listings can be implemented (e.g., stored in active database on service provider) and made available for future search requests. The listing performance and user response information can again be automatically reported to the respective advertisers on a scheduled basis at 950.

Figure 10:
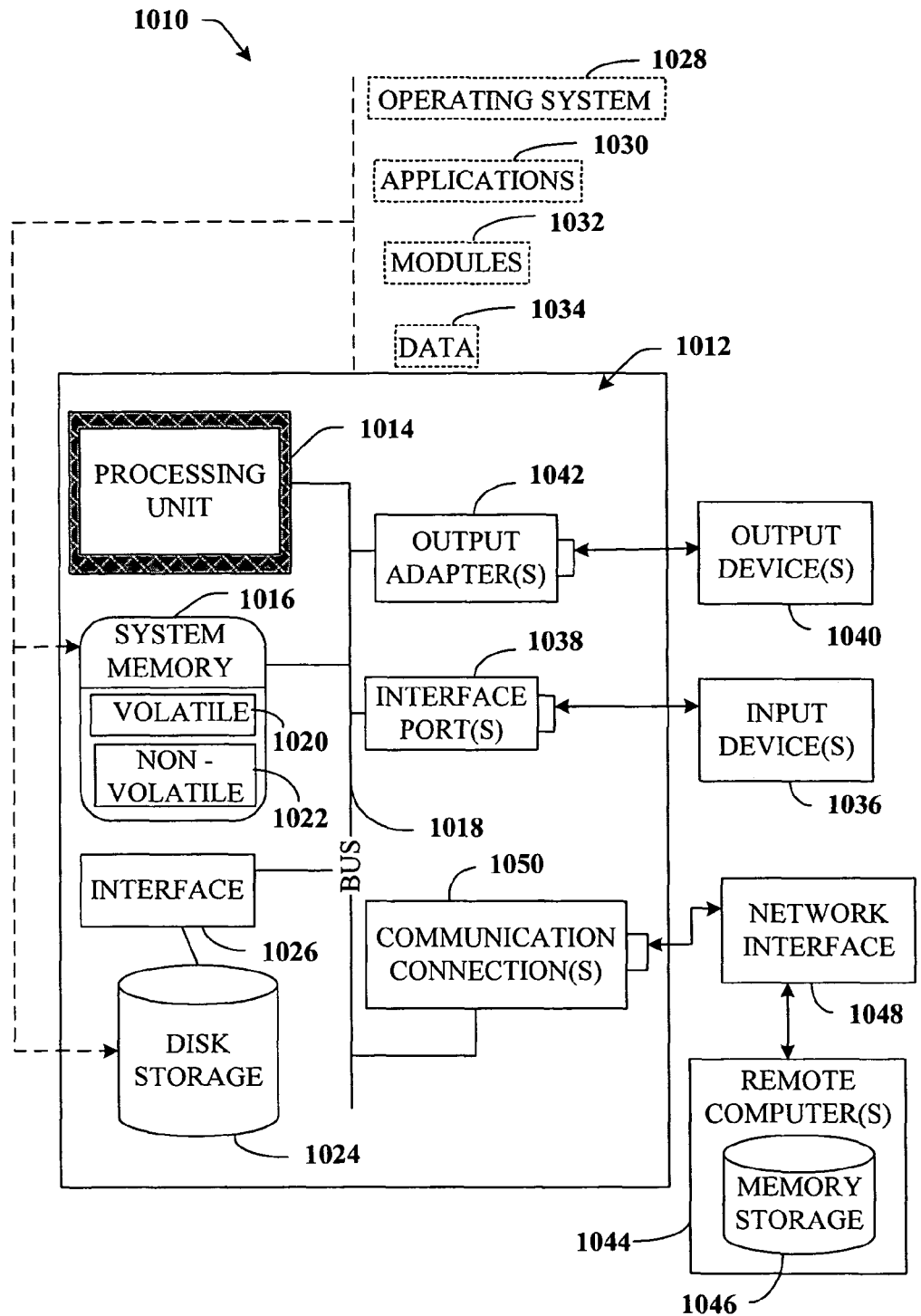
FIG. 10 is an exemplary environment for implementing various aspects of the invention.

In order to provide additional context for various aspects of the present invention, FIG. 10 and the following discussion are intended to provide a brief, general description of a suitable operating environment 1010 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that can perform particular tasks or implement particular data types. The operating environment 1010 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples the system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/nonremovable, volatile/nonvolatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012 and to output information from computer 1012 to an output device 1040. Output adapter 1042 is provided to illustrate that there are some output devices 1040 like monitors, speakers, and printers among other output devices 1040 that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. One or more computer storage media having computer-executable instructions that, when executed by a computer, cause the computer to perform operations comprising:
    receiving a search request from a user, wherein the user provides the search request by utilizing a computing device having an associated display device;
    identifying a plurality of search results that are relevant to the search request, wherein the plurality of search results includes at least one paid inclusion listing and a second listing that is not a paid inclusion listing;
    determining a type of display device associated with the user's computing device, thereby identifying display constraints associated with the user's display device;
    retrieving user preferences from a database;
    modifying the at least one paid inclusion listing according to a paid inclusion customer selected enhancement option, wherein modifying the at least one paid inclusion listing includes balancing user preferences and paid inclusion customer selected enhancement option and further wherein balancing user preferences and paid inclusion customer selected enhancement option includes assigning one or more weights to each of the user preferences and the paid inclusion customer selected enhancement option to optimize a value of the at least one paid inclusion listing with respect to both the user and the paid inclusion customer;
    rendering the plurality of search results for display on the user's display device based in part upon the display constraints associated with the user's display device, the paid inclusion customer selected enhancement option, and the user preferences such that the paid inclusion listing is displayed differently than the second listing; and
    reporting performance of the at least one paid inclusion listing to the paid inclusion customer to facilitate optimizing listing performance and revenues, wherein said reporting includes generating an enhancement component matrix and providing said matrix to the paid inclusion customer, said matrix comprising:
        (1) at least one row corresponding to the at least one paid inclusion listing;
        (2) a first column corresponding to the paid inclusion customer selected enhancement option that affects a display of the at least one paid inclusion listing within a search results display, wherein the first column includes an indication that the corresponding paid inclusion customer selected enhancement option was applied to the at least one paid inclusion listing; and
        (3) a second column corresponding to a performance attribute, wherein the performance attribute includes information about a user response to the at least one paid inclusion listing.

2. The media of claim 1, wherein said matrix further includes a third column corresponding to an additional paid inclusion enhancement option, said third column including an indication that the additional paid inclusion enhancement option was not applied to the at least one paid inclusion listing.

3. The media of claim 1, wherein the one or more weights are determined by utilizing artificial intelligence.

4. The media of claim 1, wherein the selected enhancement option comprises at least one of:
    bolding at least a portion of listing;
    adding a background to at least a portion of listing;
    changing text color of listing to an alternative color different from a standard listing color;
    altering text font of listing to be different from a standard listing font;
    increasing font size of listing greater than standard listing font size;
    animating at least a portion of listing;
    dynamically replacing at least a portion of listing with at least one search term;
    adding a thumbnail to the listing corresponding to some content of the listing;
    replacing listing text with a thumbnail that is representative of the content in the listing;
    adding an icon to the listing that indicates a preferred status of the listing; or
    positioning the listing apart from other listings while retaining ordering rights based on relevance of listing with respect to search query.

5. The media of claim 1, further comprising globally applying the selected enhancement option to a plurality of paid inclusion listings based on a consensus of behaviors associated with users in a particular service area.

6. The media of claim 1, wherein the selected enhancement option is sensitive to cultural, time zone, and regional differences to mitigate offensive listings.

7. The media of claim 1, further comprising hovering a pointing device over the rendered enhanced listing to visualize enhancement.

* * * * *